Aug. 8, 1950          G. V. WOODLING          2,517,617

INTERLOCKING TUBE COUPLING SLEEVE

Filed Jan. 31, 1949

INVENTOR.
George V. Woodling
BY

Patented Aug. 8, 1950

2,517,617

UNITED STATES PATENT OFFICE 2,517,617

INTERLOCKING TUBE COUPLING SLEEVE

George V. Woodling, Cleveland, Ohio

Application January 31, 1949, Serial No. 73,767

2 Claims. (Cl. 285—122)

My invention relates in general to connecting devices and more particularly to connecting devices for tube fittings.

An object of my invention is the provision of a clamping sleeve provided with a projecting rib which presses against and bites into the back side of the flared end of the tube to resist outward "swelling" or swaging of the sleeve as it is pressed against the taper of the flared end of the tube.

Another object of my invention is the provision of supporting a clamping sleeve against radial swelling by providing interlocking engagement between the sleeve and the back side of the flare of the tube.

Another object of my invention is the provision of a clamping sleeve which will stick or remain temporarily set or affixed against the back side of the flare of the tube when the nut is released, whereby when the nut is retightened the sleeve will be pressed against the flare in its same original position.

Another object of my invention is the provision of a clamping sleeve which is harder than the tube, the coupling element, or the nut which presses the clamping sleeve against the flared end of the tube.

Another object of my invention is the provision of a clamping sleeve which has a greater tensile strength than the tensile strength of the tube, the coupling element or the nut.

Another object of my invention is the provision of a metallurgically hardened clamping sleeve.

Another object of my invention is the provision of improving the fluid sealing engagement between the flared end of the tube and the abutting end of the coupling element against which the tube is pressed by the clamping sleeve.

Other objects and a fuller understanding of my invention may be had by referring to the following description and claims take in conjunction with the accompanying drawings, in which:

Figure 1:
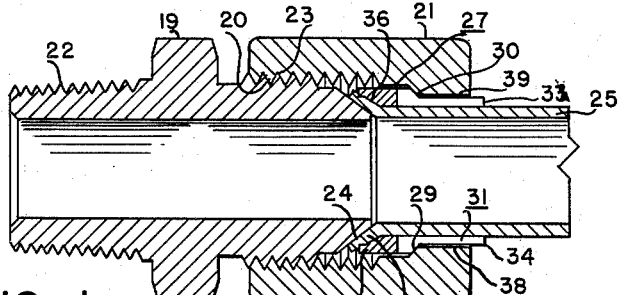
Figure 1 is a longitudinal cross-section view of a tube fitting and clamping sleeve embodying the features of my invention.
Figure 2:
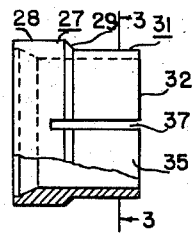
Figure 2 is a side view of the clamping sleeve with a portion being sectioned.
Figure 4:
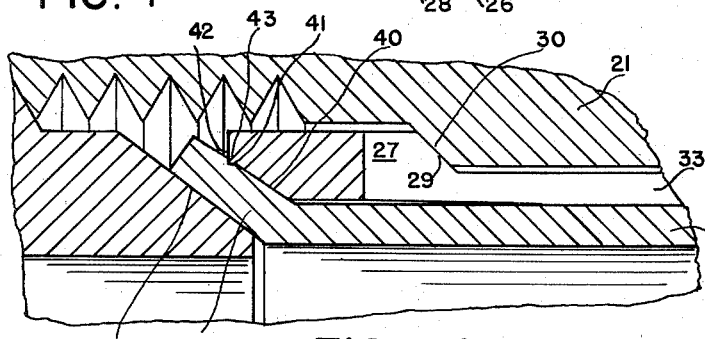
Figure 4 is an enlarged fragmentary view of the coupling element, the nut, and the sleeve showing the projecting rib biting into the back side of the flare.
Figure 3:
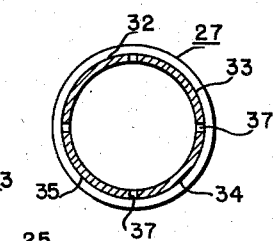
Figure 3 is a view of the sleeve taken along the line 3—3 of Figure 2.

With reference to Figure 1 of the drawing, my invention is shown as being applied to a tube fitting or coupling device comprising a coupling element 19, a tube 25 adapted to be connected thereto, a clamping sleeve 27 surrounding the tube 25, and a clamping nut 21 which is adapted to press the clamping sleeve 27 against the flared end 26 of the tube. The left-hand end of the coupling or fitting element 19 is provided with threads 22 which are usually in the form of pipe threads for engaging a cylinder or other fluid connecting devices. The right-hand end of the coupling element 19 is provided with male threads 20 to which is threadably attached the compression nut 21 having female threads 23 which threadably engage the male threads 20. The right-hand end of the coupling element 19 is provided with a beveled abutment or seat end 24 against which the flared end 26 of the tube is tightly fastened by means of the clamping sleeve 27. The left-hand end of the clamping sleeve comprises an annular end portion 28 having an abuttable or clamping end surface 36 which abuts against the back side of the flare 26 of the tube. Extending rearwardly of the annular end portion 28 of the clamping sleeve is a tapered intermediate portion or shoulder 29, and a tail end portion 31. The tapered intermediate portion 29 and the tail end portion 31 are slotted at 37 which forms rearwardly extending clamping fingers 32, 33, 34 and 35 which, when the nut 21 is tightened, are adapted to clamp the tube 25 at a point remote from the flared end of the tube for supporting the tube against vibrations and fluid shocks. The nut 21 is provided with an internal tapered or clamping shoulder 30 which presses against the tapered intermediate portion 29 of the clamping sleeve as the nut 21 is turned onto the coupling element 19. The angle of the tapered intermediate portion 29 on the sleeve may be of any suitable value such that the fingers are flexed inwardly against the tube when the nut 21 is tightened.

The clamping end surface 36 of the sleeve 27 comprises first, second and third surfaces 40, 41 and 42, respectively, which are angularly related to each other. The first surface 40 begins at the bore of the sleeve and extends outwardly as an internal conical seat for engaging the outer face of the flared end of the tube. The second surface 41 extends forwardly from the terminus of the first surface in a general direction of the axis of the coupling. The third surface 42 extends outwardly from the terminus of the second surface and terminates at the outer surface of the sleeve. The second and third surfaces 41 and 42 meet to define a substantially V-shaped rib 43 to bite into the outer face of the flare. The second surface is shorter than the third surface to limit the extent that the rib 43 bites into the outer surface of the flare. Preferably, the length of the second surface 41 may be approximately .010 of an inch, and may vary between .005 to .015 of an inch. The amount that the rib 43 bites into the flare is preferably less than one-third the thickness of the wall of the flare. The rib 43 presses an annular groove into the back side of the flare and makes an interlocking engagement with the flare which resists outward swelling of the sleeve as it is pressed by the nut against the taper of the flared end of the tube. Since the sleeve is supported against swelling as the nut is tightened, a clearance between the outside surface of the sleeve and the inside of the nut is maintained, which means that the nut may be easily disengaged without the sleeve jamming in the nut.

The rib sticks or remains temporarily set or affixed against the back side of the flare when the nut is released, whereby when the nut is retightened the sleeve will be pressed against the flare in its same original position. The sleeve, however, may be easily disengaged from the flare by giving it a small tap with a suitable tool. The rib is disposed near the outer marginal edge of the flare, so that the first conical surface 40 is sufficiently long to engage the flare for making a good sealing engagement. The length of the first surface 40 is preferably longer than the combined length of both the surfaces 41 and 42, so that the groove made by the rib is located near the marginal edge of the flare. For a sleeve which fits a ¼-inch tube, the length of the surface 40 may be approximately .062 of an inch, the surface 41 approximately .010 of an inch, and the surface 42 approximately .030 of an inch. In larger size sleeves, the length of the surface 40 increases while the surfaces 41 and 42 remain approximately the same. Beside resisting radial expansion of the sleeve, the groove operates to prevent small marginal cracks in the flare from developing and extending toward the base of the flare, because the instant that a crack reaches the groove, it will tend to run around in the groove instead of proceeding toward the base of the flare where a leak is apt to occur. The interlocking engagement between the rib 43 and the back side of the flare also resists longitudinal pull of the tube from the coupling.

In assembling the fitting, as the nut 21 is turned onto the coupling element 19, the internal clamping shoulder 30 contracts the tapered intermediate portion 29 and thereby causes the clamping fingers 32, 33, 34 and 35 to be tightly clamped about the tube 25 to produce a good strong frictional grip. The intermediate tapered portion 29 constitutes the sole support for the clamping fingers 32, 33, 34 and 35, and in their clamped position a clearance 39 exists between the outer surface of the clamping fingers and the internal surface 38 of the sleeve nut. The clearance shows that the clamping fingers are radially spaced from and unsupported by the internal surface 38 of the nut 21.

In the construction of my sleeve, I preferably employ alloy steel known as 4140, and it is preferably heat-treated throughout its entire mass to a Rockwell hardness value in the neighborhood of 40 to 45. Tables and calculations show a sleeve made in accordance with these specifications has a tensile strength in the neighborhood of 206,000 pounds per square inch. When the nut and the connector body or element are made of free-machining steel, such for example as steel known as 1020, the tensile strength may range from 90,000 to 120,000 pounds per square inch. In other words, my sleeve has substantially twice the tensile strength of that of free-machining steel from which most steel coupling members and nuts are made. My sleeve is harder than the tube, the nut or the connector body and is the most durable part of the connection for sealing high fluid pressures. The hardened sleeve enables the rib 43 to easily penetrate the back side of the flare for making the interlocking engagement. The combination of the added tensile strength of the sleeve due to heat treatment plus the support from the interlocking engagement, make my sleeve doubly strong against swelling as the nut is tightened. In my invention, the nut may be readily backed off, since the forward end of the annular head portion 28 does not "swell" or "swage" within the nut. I preferably make my clamping sleeve of steel which when hardened has a high tensile strength, whereby the clamping fingers produce ample spring contact pressure against the tube to absorb vibration. The hardened sleeve also permits the internal clamping shoulder 30 of the nut from crushing the intermediate tapered portion 29 so that when the sleeve nut 21 is disengaged from the coupling element the clamping fingers spring back to their original position.

Figure 5:
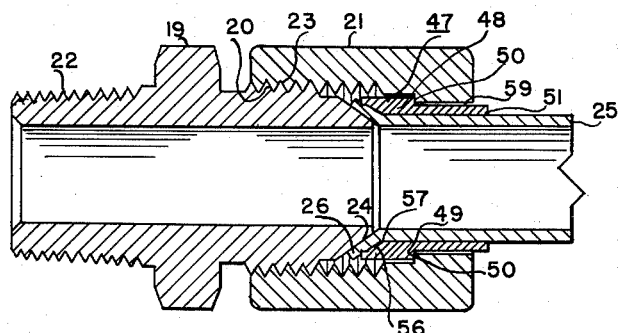
Figure 5 is a longitudinal cross-sectional view of a modified tube coupling and clamping sleeve embodying the features of my invention.
Figure 6:
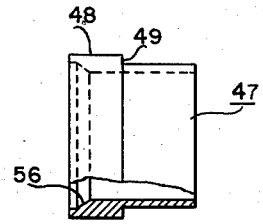
Figure 6 is a side view of the modified clamping sleeve shown in Figure 5 with a portion being sectioned.

In Figures 5 and 6, I show a modified sleeve 47 which comprises an annular head portion 48 having an internal conical clamping surface or seat 36 the same as that shown in Figures 1 to 4. Extending rearwardly of the annular head portion 48 of the clamping sleeve is a tubular portion 51 integrally connected thereto. The wall thickness of the annular head portion 48 is greater than that of the tubular body 51. As illustrated, the sleeve has a laterally extending external shoulder 49 extending between the annular head portion 28 and the tubular body portion 31, and is adapted to be engaged by a clamping shoulder 50 on the coupling nut. The shoulder 49 on the sleeve extends outwardly at substantially a right angle with respect to the longitudinal axis of the coupling member, and thus the engageable surface of the shoulder 49 on the sleeve is substantially equal to the difference in thickness between the annular head portion 48 and the tubular body portion 51 which is small. Consequently, the small shoulder on the sleeve is subjected to heavy forces by the clamping action of the internal clamping shoulder 50 on the coupling nut.

By constructing my sleeve out of alloy steel which is heat-treated, I find that the small square shoulder on the sleeve is capable of withstanding an excessive amount of concentrated force by the clamping action of the internal clamping shoulder 50 on the nut without mutilating or distorting the sleeve. Furthermore, with the use of alloy steel which is heat-treated and tempered, there is no tendency for the metal of the nut and the metal of the sleeve to gall or score. The annular head portion 48 is subjected to radial pressure and tends to expand the forward end of the annular head portion into contact engagement with the annular inner surface of the nut. My sleeve, because of the interlocking engagement between the rib 43 and the flare and because of the fact that the sleeve is made of heat treated alloy steel, operates to resist radial expansion of the forward end of the annular head portion 28, and thereby maintains a clearance between the forward end of the annular head portion and the annular internal surface of the nut. The internal conical seat 36 begins at substantially the place where the lead line to the reference character 57 touches the sleeve and it is to be observed that this point 57 is substantially longitudinally midway between the external shoulder 49 and the forward end of the annular head portion 28, with the result that the forward clamping end of the sleeve is subjected to radial expansion, but is resisted from expanding by the rib 43 and the high tensile strength of the sleeve.

A clearance 59 between the outside surface of the tubular body portion 51 and the inside surface of the nut is always maintained.

Figure 7:
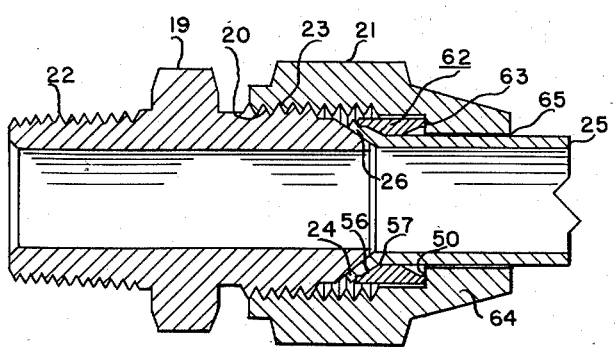
Figure 7 is a longitudinal cross-sectional view of a tube coupling showing a further modified sleeve embodying the features of my invention.
Figure 8:
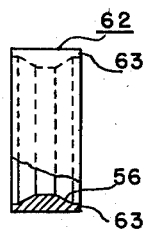
Figure 8 is a side view of the modified sleeve shown in Figure 7, with a portion being sectioned.

With reference to Figures 7 and 8, I show a further modified form of my clamping sleeve, which is indicated by the refence character 62; other parts of the figures which correspond to those of Figures 1 to 6 are identified by the same reference character. As illustrated in Figures 7 and 8, the hardened sleeve 62 does not have the tubular body portion, but is substantially triangular shaped in cross-section. In addition, the sleeve is symmetrical with respect to a plane passing perpendicular through the center, so that the sleeve may be turned end-to-end. As illustrated, the ends of the sleeves are provided with the end surfaces 42 against which the shoulder 50 of the nut engages. In this illustration, the nut is provided with a rearward extension which closely surrounds the tube, with a small clearance 65 for laterally supporting the tube in the event that the tube is bent or vibrated, which takes up the clearance 65 between the tube and the rearward extension of the nut. This hardened sleeve will not expand radially and jam within the nut, and also the end surface 42 of the sleeve which engages the internal shoulder 50 of the nut is able to withstand concentrated stresses, even though the radial extent of the shoulder is less than the thickness of the sleeve.

The three angularly related surfaces 40, 41 and 42 are the same in all the types of sleeves shown in the drawing. The rib 43 easily penetrates the back side of the flare and thus does not interfere with the tight pressing of the surface 40 against the flare for making a good sealing engagement. The surface 42 extends outwardly from the terminus of the surface 41 at an angle which is greater than the angle that the surface 40 makes with the longitudinal axis of the coupling. In this manner, the surface 42 does not interfere with the surface 40 from making a good engagement with the base of the flare, as would be the case if the surface 42 had an angle about the same as the surface 40. In other words, the surface 42 recedes away from the flare whereas the surface 40 presses substantially flat against the flare. Thus, if the surface 40 were outwardly extended it would intersect the surface 42 and not the outside surface of the sleeve.

The abuttable surface 24 of the coupling element continuously supports the front or inner side of the flare throughout its entire length, which means that the thickness of the flare is decreased where the groove is made. Since the backside of the flare is continuously supported throughout its entire length, a firm interlocking engagement is provided between the groove and the rib 43. This firm interlocking engagement offers good resistance to the swelling of the sleeve when the nut is tightened.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

1. A sleeve for a coupling, said sleeve having a bore to receive an insertable member of a substantially cylindrical outer surface and provided with a flared end, said sleeve having a clamping end abuttable against the outer face of the flared end of the insertable member, said sleeve also having a shoulder against which a coupling member engages for forcing the clamping end of the sleeve against the outer face of the flared end of the insertable member, said clamping end of the sleeve comprising first, second, and third surfaces angularly related to each other, said first surface beginning at the bore of the sleeve and comprising an outwardly extending internal conical seat for engaging the outer face of the flared end of the insertable member, said second surface extending forwardly from the terminus of the first surface in a general direction of the axis of the coupling, said third surface extending outwardly from the terminus of the second surface and terminating at the outer surface of the sleeve, said second and third surfaces meeting to define a substantially V-shaped rib to bite into the outer face of the flare, said second surface being shorter than said third surface to thereby limit the extent that the rib bites into the outer surface of the flare, said first surface being longer than the combined length of both of said second and third surfaces.

2. A sleeve for a coupling, said sleeve having a bore to receive an insertable member of a substantially cylindrical outer surface and provided with a flared end, said sleeve having a clamping end abuttable against the outer face of the flared end of the insertable member, said sleeve also having a shoulder against which a coupling member engages for forcing the clamping end of the sleeve against the outer face of the flared end of the insertable member, said clamping end of the sleeve comprising first, second, and third surfaces angularly related to each other, said first surface beginning at the bore of the sleeve and comprising an outwardly extending internal conical seat for engaging the outer face of the flared end of the insertable member, said second surface extending forwardly from the terminus of the first surface in a general direction of the axis of the coupling, said third surface extending outwardly from the terminus of the second surface and terminating at the outer surface of the sleeve, said second and third surfaces meeting to define a substantially V-shaped rib to bite into the outer face of the flare, said second surface being shorter than said third surface and ranging from approximately .005 to .015 of an inch to thereby limit the extent that the rib bites into the outer surface of the flare, said first surface being longer than the combined length of both of said second and third surfaces.

GEORGE V. WOODLING.

REFERENCES CITED

The following references are of record in the file of this patent:

UNITED STATES PATENTS

| Number | Name | Date |
|---|---|---|
| 2,289,382 | Parker | July 14, 1942 |
| 2,328,469 | Laffly | Aug. 31, 1943 |
| 2,351,362 | Parker | June 13, 1944 |
| 2,452,278 | Woodling | Oct. 26, 1948 |